US006809627B2

(12) United States Patent
Castonguay, Jr. et al.

(10) Patent No.: US 6,809,627 B2
(45) Date of Patent: Oct. 26, 2004

(54) FUSE INDICATOR LABEL

(75) Inventors: Roland J. Castonguay, Jr., Leicester, MA (US); Michael F. Paul, Brookfield, MA (US); James L. Potter, Warren, MA (US); Daniel P. Segall, Longmeadow, MA (US); John R. Pennace, Paxton, MA (US)

(73) Assignee: FLEXcon, Inc., Spencer, MA (US)

( * ) Notice: Subject to any disclaimer, the term of this patent is extended or adjusted under 35 U.S.C. 154(b) by 0 days.

(21) Appl. No.: 10/208,989

(22) Filed: Jul. 31, 2002

(65) Prior Publication Data

US 2003/0011462 A1 Jan. 16, 2003

Related U.S. Application Data

(63) Continuation of application No. 09/909,271, filed on Jul. 19, 2001, now Pat. No. 6,459,357, which is a continuation of application No. 09/668,512, filed on Sep. 22, 2000, now Pat. No. 6,292,087, which is a continuation of application No. 09/361,441, filed on Jul. 26, 1999, now abandoned, which is a continuation of application No. 09/126,911, filed on Jul. 31, 1998, now Pat. No. 5,994,993.

(51) Int. Cl.[7] ......................... H01H 85/30; G01D 13/04

(52) U.S. Cl. ....................... 337/243; 337/206; 337/241; 337/265; 116/207

(58) Field of Search ................................ 337/206, 241, 337/265, 266, 267, 332, 376, 79, 243, 244; 439/490, 491, 622; 324/507, 550, 691; 340/638, 639; 361/835; 81/3.8; 116/202, 206, 207

(56) References Cited

U.S. PATENT DOCUMENTS

| | | | |
|---|---|---|---|
| 737,280 | A | 8/1903 | Sachs |
| 737,281 | A | 8/1903 | Sachs |
| 737,368 | A | 8/1903 | Downes |
| 737,369 | A | 8/1903 | Downes |
| 792,530 | A | 6/1905 | Marshall |
| 809,978 | A | 1/1906 | Olge |
| 821,873 | A | 5/1906 | Hoffman |
| 1,014,741 | A | 1/1912 | Barringer et al. |
| 1,040,150 | A | 10/1912 | Cole |
| 1,087,120 | A | 2/1914 | Hooker |
| 1,246,417 | A | 11/1917 | Gilbert |
| 1,591,029 | A | 7/1926 | Feldkamp |
| 1,793,103 | A | 2/1931 | LaMar |
| 2,115,846 | A | 4/1938 | Quisling |
| 2,164,658 | A | 7/1939 | Lyon |
| 2,175,250 | A | 10/1939 | Burrows et al. |
| 2,702,329 | A | 2/1955 | Dietz, Jr. et al. |
| 2,734,967 | A | 2/1956 | Benedict |
| 2,788,423 | A | 4/1957 | Lang |
| 3,182,153 | A | 5/1965 | Postal |

(List continued on next page.)

FOREIGN PATENT DOCUMENTS

| | | |
|---|---|---|
| DE | 3332839 | 8/1984 |
| EP | 0213404 | 2/1985 |
| GB | 1093482 | 12/1967 |
| RU | 666595 | 6/1979 |
| WO | WO 86/06873 | 11/1986 |
| WO | WO 97/39458 | 10/1997 |

*Primary Examiner*—Anatoly Vortman
(74) *Attorney, Agent, or Firm*—Gauthier & Connors

(57) ABSTRACT

A fuse indicator is disclosed for indicating the status of a fuse. The fuse indicator includes an electrically conductive material that extends between conductive ends of a fuse and undergoes a visible change in appearance upon being subjected to electrical current above a threshold. The fuse indicator also includes a layer of indicator material that becomes exposed beneath the electrically conductive material when the fuse indicator is subjected to electrical current above the threshold. The fuse indicator also includes adhesive for maintaining contact between the electrically conductive material and the layer of indicator material.

8 Claims, 3 Drawing Sheets

U.S. PATENT DOCUMENTS 3,336,452 A 8/1967 Baker
3,396,335 A 8/1968 Burr et al.
3,513,427 A 5/1970 Prosser et al.
3,794,953 A 2/1974 Malin
3,814,139 A 6/1974 Loyd et al.
3,826,141 A 7/1974 Pickett et al.
3,863,191 A 1/1975 Salzer
3,997,862 A 12/1976 Kozacka et al.
4,127,837 A 11/1978 Borchart
4,142,151 A 2/1979 Hansen
4,308,516 A 12/1981 Shimada et al.
4,401,356 A 8/1983 Bare
4,469,452 A * 9/1984 Sharpless et al. ........... 374/160
4,641,120 A 2/1987 Bonfig et al.
4,760,367 A 7/1988 Williams
4,835,476 A 5/1989 Kurosawa
4,873,506 A 10/1989 Gurevich
4,906,963 A 3/1990 Ackermann et al.
5,111,177 A 5/1992 Krueger et al.
5,196,819 A 3/1993 Roberts
5,225,473 A 7/1993 Duan
5,481,239 A 1/1996 Di Troia
5,525,181 A 6/1996 Bruckner et al.
5,604,049 A 2/1997 Weiss et al.
5,606,301 A 2/1997 Ishimura
5,612,151 A 3/1997 Hughen
5,644,282 A 7/1997 Mehta et al.
5,673,028 A 9/1997 Levy
5,776,371 A 7/1998 Parker
5,800,724 A 9/1998 Habeger et al.
5,821,849 A 10/1998 Dietsch et al.
5,894,048 A 4/1999 Eckart et al.
5,936,508 A 8/1999 Parker
6,456,189 B1 * 9/2002 Mosesian et al. ........... 337/243

* cited by examiner

FUSE INDICATOR LABEL

This application is a Continuation and hereby claims benefit under 35 U.S.C. §120 to the following applications Ser. No. 09/909,271 filed on Jul. 19, 2001, now U.S. Pat. No. 6,459,357, which was filed as a continuation of Ser. No. 09/668,512 filed Sep. 22, 2000 (now U.S. Pat. No. 6,292,087) which was filed as a continuation application of Ser. No. 09/361,441 filed Jul. 26, 1999 (now abandoned), which was filed as a continuation application of Ser. No. 09/126,911 filed Jul. 31, 1998 (now U.S. Pat. No. 5,944,993).

BACKGROUND OF THE INVENTION

The invention relates to fuses, and particularly relates to fuse indicators for indicating the status of a fuse.

Although fuses are ubiquitous in electrical systems, serving to protect the electrical systems themselves as well as the safety of persons using the systems, the detection of whether a fuse has been overcharged, (or blown), is often expensive and time consuming, particularly if an electrical system includes numerous fuses. Many fuses undergo no physical change in appearance upon being overcharged. Moreover, sometimes the contacts within a fuse may separate due to the fuse having undergone too many cycles of on-off use or too many cycles between widely varying temperatures, leaving no visible indication of having developed an open circuit. Fuse indicators have been developed to permit more rapid identification of the status of a fuse, typically by visual inspection of an indicator portion of a fuse.

Conventional fuse indicators generally include either a current sensor circuit that provides a visible indication of whether current is flowing through the fuse, or include a second fusable conductor path in parallel with the fuse filament. Fuse indicators with current sensor circuits include those disclosed in U.S. Pat. No. 4,641,120 which discloses a current sensor circuit that uses the current flowing through the fuse to light a light emitting diode (LED), and U.S. Pat. No. 2,164,658 which discloses a current sensor circuit including a lamp and resistor in parallel with the fuse. Such fuse indicators, however, are typically expensive to manufacture and must be carefully handled so as to not disturb the current sensor circuit. Further, such fuse indicators require that the power to a circuit be on in order to identify whether the LED or lamp should be activated. This may be not only inconvenient, but dangerous as well.

Fuse indicators that include a second conductor path are typically designed such that the second conductor path has a higher resistance than the fusable filament, and the second conductor path undergoes a visible change when subjected to excess current. During use, when excess current flows through the fuse filament (i.e., when the fuse is activated by overheating, or blows), then the current will travel the second conductor path and immediately cause it to undergo the desired visible change as the second conductor path is overheated, leaving an open circuit. For example, U.S. Pat. No. 1,793,103 discloses a fuse indicator, including a fusible wire within a transparent glass tube. Such fuse indicators, however, are also generally expensive and require delicate handling to ensure that the second conductor path is not disturbed.

Although the above types of fuse indicators have been known for quite some time, the need remains for a fuse indicator that reliably indicates the status of a fuse, yet is inexpensive to manufacture, is easily handled, and is convenient to use.

SUMMARY OF THE INVENTION

The invention provides a fuse indicator for indicating the status of a fuse. The fuse indicator includes a conductive material adapted to extend between conductive ends of a fuse, and adapted to undergo a visible change in appearance upon being subjected to electrical current above a threshold. The fuse indicator of the invention further includes an adhesive for maintaining contact between the conductive material and the conductive ends of the fuse.

BRIEF DESCRIPTION OF THE DRAWINGS

The following detailed description of the illustrated embodiments may be further understood with reference to the accompanying drawings in which.

The drawings are for illustrative purposes only and are not to scale.

DETAILED DESCRIPTION OF THE ILLUSTRATED EMBODIMENTS

The invention provides a fuse indicator that may be applied to a fuse as a label. A fuse indicator of the invention includes a clear thin film and a thin conductive film adhered to one side of the clear film. The opposite side of the clear film may be print receptive, and information such as fuse data may be printed on the film as a label. Either end of the conductive film may be positioned to contact the two conductive ends of a fuse to form an electrical connection with the fuse in parallel with the fuse filament.

The conductive path provided by the conductive film is of a resistance that is higher than the resistance of the fuse filament. In normal use, therefore, the current will prefer to travel the conductive path of the fuse filament. If the fuse filament is overcharged and blows, then the current will travel the conductive path provided by the conductive film. The conductive film will then be overcharged and will undergo a deformation or discoloration. This change will be visible through the clear film, and will serve as an indication of the status of the fuse.

EXAMPLE 1

Figure 1:
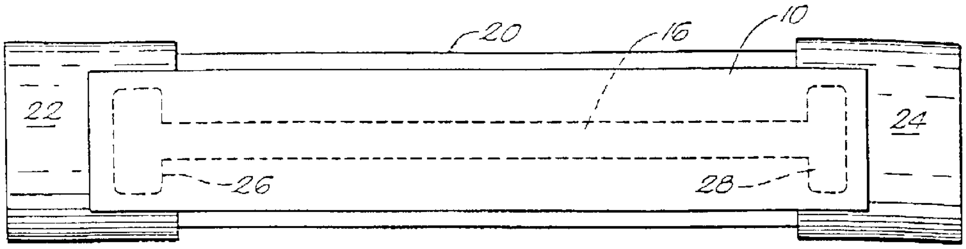
FIG. 1 shows a top view of a fuse indicator label of the invention applied to a conventional cartridge type fuse.
Figure 2:
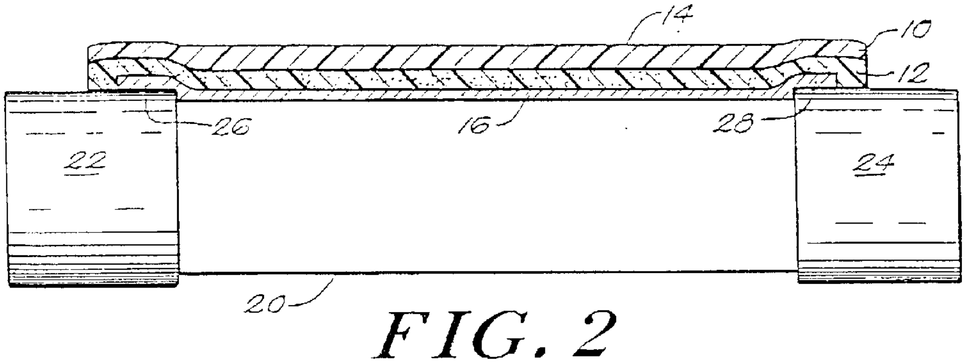
FIG. 2 shows a side view of the fuse indicator label and fuse of FIG. 1 with the fuse indicator label only shown in cross section taken lengthwise through the center of the fuse indicator label.

As shown in FIGS. 1 and 2, a fuse indicator of the invention includes a 2 mil clear polyester film 10, on one side of which is applied a 1 mil clear pressure sensitive adhesive 12. The fuse indicator is shown in cross section and on an enlarged scale with respect to the fuse for illustrative purposes. The opposite side of the film is provided with a printable surface 14 on which information may be printed, e.g., fuse data and indicator information. The label is formed by vacuum depositing a layer of conductive material onto a carrier film such as polyester, which is then die cut into the desired shape as shown. An adhesive is then applied to the deposited conductive material. The conductive material does not extend beyond the clear polyester film or the adhesive 12.

Figure 3:
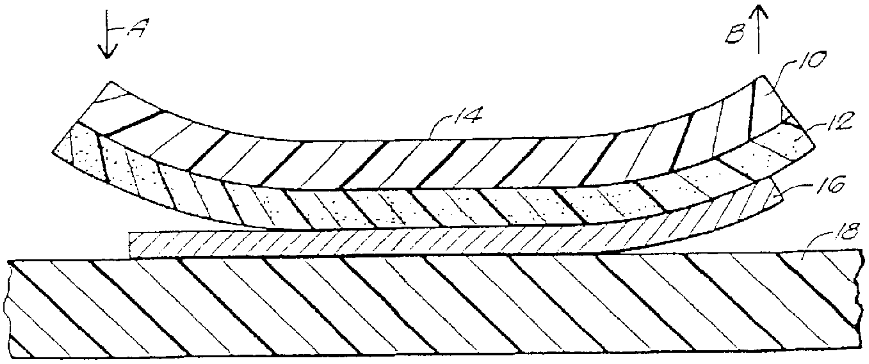
FIG. 3 shows a metallization transfer process for providing a metal layer on a fuse indicator label of the invention.

With reference to FIG. 3, in alternative embodiments, the metal conductor layer may be applied to the label by film transfer such as disclosed in U.S. patent application Ser. No. 09/020,150, the further disclosure of which is hereby incorporated by reference. Film transfer typically involves first vacuum depositing a metal such as aluminum 16 onto a carrier film 18 that includes a release coating, or is itself an inherently release substrate. The aluminum surface of the carrier film 18 may then be applied to the adhesive 12 as shown generally at A in FIG. 3. When the film 10 is removed from the carrier film 18, the aluminum deposit 16 is transferred to the adhesive 12 on the film 10 as shown generally at B in FIG. 3.

In further embodiments, other materials may be employed for use as the film, including polypropylene, polyethylene or polyamides, or polyethyl ether ketone etc, depending on the desired properties of the film taking into account the characteristics of the intended operating environment.

A fuse 20 typically includes conductor end portions 22 and 24, and the end portions 26 and 28 of the metallized component 16 are designed to overlay one of end portions 22 and 24 respectively as shown in FIGS. 1 and 2. The fuse 20 may be, for example, a 15–30 Amp fuse and have a resistance on the order of 1 ohm. The resistance of the conductive portion 16 in this example, would be about 200–300 Ohms. During normal use, the current will preferentially flow through the path of least resistance, which is the fuse element itself. If the fuse 20 were to become overcharged and blow, then the current would immediately chose to flow through the conductive material, causing it too to blow. The conductive material 16 is designed to provide a distinctive indication of the conductive material 16 having become overcharged. For example, in one embodiment, the clear film 10 may become significantly discolored when the material 16 burns out. The label, therefore, provides an indication of the status of the fuse.

EXAMPLE 2

In this example, the conductive layer 36 is applied to the film 10 and adhesive 12, as a die-cut piece of metallized (vacuum deposition of aluminum onto a polyester film) with the conductive side facing away from the adhesive. By supporting the conductive layer in such a fashion prior to the application of the label, it is possible to increase the stiffness of the total composite, which may have advantages in certain applications, depending on the geometry of the fuse and the intended operating environment.

In further embodiments, an indicator label may be formed as in Example 2, using flame resistant films for the film 10. Such films may be, for example, rigid PVC, TEDLAR brand poly vinyl fluoride, TEFLON® brand poly tetra fluoroethylene and its copolymer derivatives as sold by the E. I. duPont de Nemours & Co., Inc. of Wilmington, Del. Pressure sensitive adhesives containing flame suppressants such as antimony, boron, phosphates, etc. may also be used. The use of such materials may reduce the extent of damage to the fuse that may occur when the current that blows out the fuse is significantly higher than the fuse rating.

EXAMPLE 3

Figure 4:
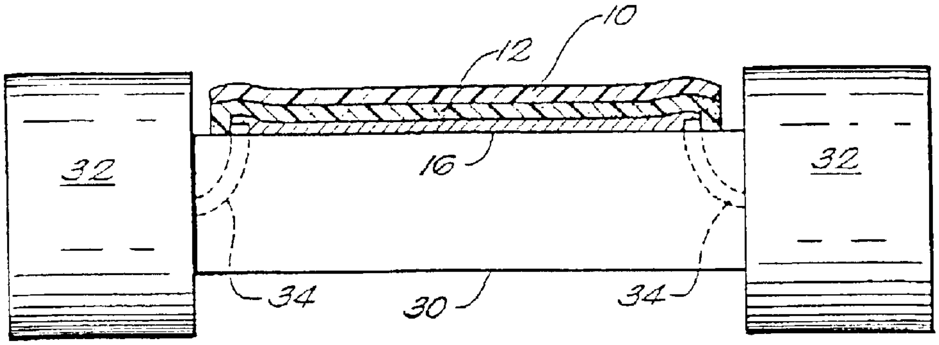
FIG. 4 shows a view similar to FIG. 2 of a fuse indicator label in accordance with another embodiment of the invention together with a fuse.

FIG. 4 shows another embodiment of the invention involving a fuse 30 having insulated end caps 32. As shown in FIG. 4, a fuse indicator label of the invention may be adhered to the fuse 30 such that the conductive material 36 of the fuse is in contact with conductor portions 34 the fuse 30. The conductor portions 34 may extend from within the fuse 30, up to the surface the fuse to provide electrical communication with either end of the fuse. Again, the resistance of the conductive material 36 should be such that the current will prefer to flow through the fuse element unless and until the fuse element is blown.

In this example, a conductive layer comprising a transferred metallized material is applied to an adhesive surface. The conductive layer 16 is formed of a vacuum deposition of aluminum to a thickness of between about 1,000 and 50,000 , and is preferably between about 10,000 and 20,000 . The conductive layer 16 is applied to the adhesive side 12 of a pressure sensitive adhesive coated label material. The placement of the conductive layer 16 is such that when the label is applied to a fuse cartridge, it must be done in registration with the conductive leads 34 on the surface of the fuse cylinder. The exposed conductive leads 34 are then completely covered by the label material.

In other embodiments, a fuse indicator label of the invention maybe employed with box type fuses wherein the leads of the fuse extend from one side of a cube toward a circuit to which the fuse is connected. Such fuse indicator labels may either contact conductor portions that extend to an exposed surface (e.g., the surface opposing the first surface from which the leads extend), or the fuse indicator label may wrap around the box type fuse to contact both leads on the first surface.

EXAMPLE 4

Figure 5:
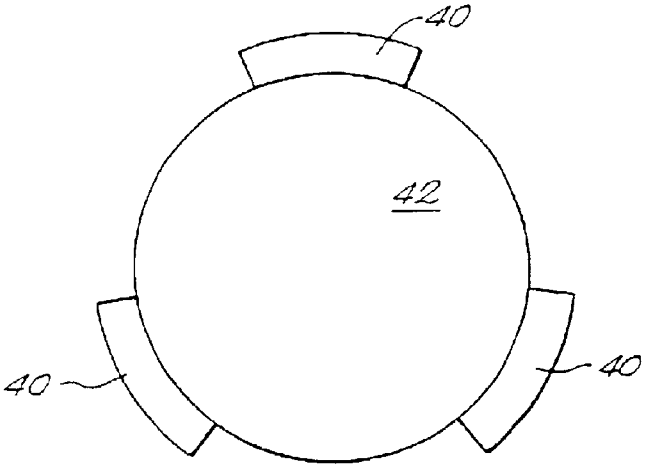
FIG. 5 shows an end view of a fuse including fuse indicator labels in accordance with another embodiment of the invention together.
Figure 6:
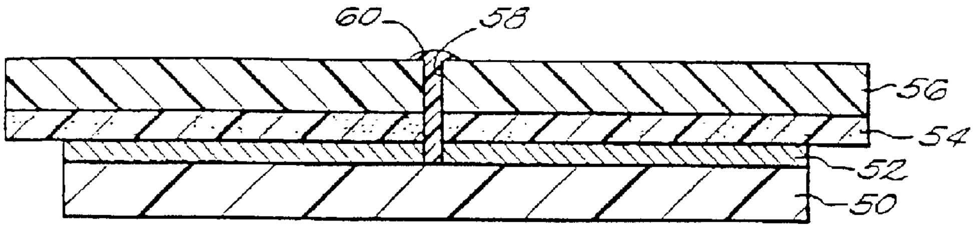
FIGS. 6 and 7 show side and top views respectively of a fuse indicator label in accordance with another embodiment of the invention prior to overcharging of the conductor portion of the fuse indicator label.
Figure 7:
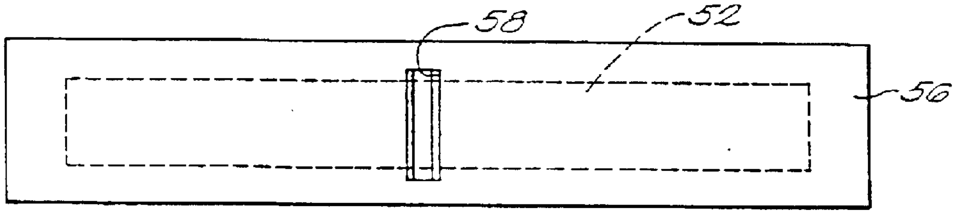
Figure 8:
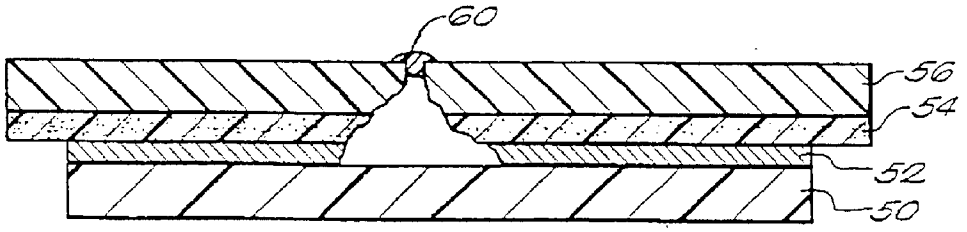
FIGS. 8 and 9 show side and top views respectively of the fuse indicator label of FIGS. 6 and 7 following overcharging of the conductor portion of the fuse indicator label.
Figure 9:
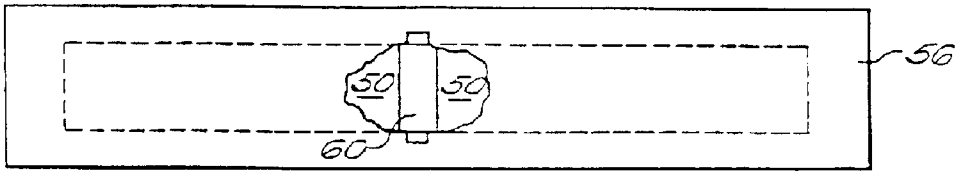

In still further embodiments of the invention, a plurality of indicator labels 40 may be positioned at various locations around a fuse 42 as shown in FIG. 5, which shows an end view of a fuse 42 including several indicator labels 40 thereon. During use, when one indicator label blows, the current being driven into the remaining indicator labels will increase, causing each of the other indicator labels to blow immediately thereafter. The result is that a fuse indicator label should be visible upon inspection irrespective of the positioning of the labels on the fuse. In other embodiments, one large label including several conductive paths may be wrapped around the fuse.

EXAMPLE 5

As shown in FIGS. 6–9, in another embodiment of the invention, an indicator fuse may include an indicator layer 50, a conductive material 52, an adhesive 54, and a clear protective layer 56. The conductive material 52 is not continuous and includes a small discontinuity or gap 58. The gap 58 may be filled with a clear dielectric material 60, such as polyethylene acrylic acid. In various embodiments, the dielectric material may cover a portion of the protective layer, or the gap may be left open and the dielectric material may comprise air from the atmosphere.

A fuse indicator label as shown in FIGS. 6–9 was prepared by vacuum depositing a ⅜ inch wide strip of aluminum to a thickness of about 16,000 onto a transfer substrate. A 1.5 mil clear polyester label together with a 0.7 mil clear acrylic pressure-sensitive adhesive, was applied to the aluminum film and subsequently separated from the transfer substrate together with the aluminum film on the adhesive side. The label and adhesive extended beyond the edges of the aluminum layer. A 4.0 mil red PVC film was then applied to the aluminum such that it did not extend beyond the edges of the aluminum layer.

The fuse indicator label was applied to a 30 Amp fuse, and when the fuse was overcharged, the red PVC below the aluminum was exposed through the clear polyester and adhesive. If the resistance of the conductive portion of the fuse indicator label is too low,(e.g., the thickness is too great), then the conductive portion of the fuse indicator will be too high and a clear indication may not be provided that the fuse has blown.

Those skilled in the art will appreciate that modifications and variations may be made to the above disclosed embodiments without departing from the spirit and scope of the invention.

What is claimed is:

1. A fuse indicator for a fuse having an electrically conductive ends, said indicator comprising:

a multilayer composite having an electrically conductive intermediate layer interposed between a dielectric base layer and a dielectric clear cover layer, said intermediate layer having a resistance greater than that of said fuse; and an adhesive for adhering said composite to said fuse with said intermediate layer providing an electrically conductive path between the ends of said fuse, said electrically conductive layer being responsive to the application thereto of an electrical current above a threshold by undergoing a visible change observable through said cover layer.

2. A fuse indicator as claimed in claim 1, wherein said adhesive is part of said multilayer composite.

3. A fuse indicator as claimed in claim 1, wherein said adhesive is interposed between said dielectric base layer and said dielectric clear layer.

4. A fuse indicator as claimed in claim 1, wherein said adhesive as adjacent said electrically conductive intermediate layer.

5. A fuse indicator as claimed in claim 1, wherein said visible change comprises a disruption in the continuity of said intermediate layer exposing the underlying base layer.

6. A fuse indicator as claimed in claim 1, wherein said base layer has a color that is different than that of said intermediate layer.

7. A fuse indicator far a fuse having electrically conductive ends, said indicator comprising:

a multiple layer composite comprising a transparent cover layer overlying an electrically conductive layer, said electrically conductive layer providing an electrically conductive path between the ends of said fuse and being responsive to the application thereto of an electrical current above a threshold by undergoing a visible change observable through said cover layer; and adhesive means for adhering said cover layer to said electrically conductive layer and for adhering said composite to said fuse.

8. The fuse indicator as claimed in claim 7 wherein said cover layer is adhered to said electrically conductive layer by transparent adhesive means.

* * * * *

UNITED STATES PATENT AND TRADEMARK OFFICE

CERTIFICATE OF CORRECTION

PATENT NO. : 6,809,627 B2
APPLICATION NO. : 10/208989
DATED : October 26, 2004
INVENTOR(S) : Castonguay, Jr. et al.

It is certified that error appears in the above-identified patent and that said Letters Patent is hereby corrected as shown below:

In Col. 6, line 15, Claim 7, please delete “far” and replace with --for--.

Signed and Sealed this

First Day of July, 2008

Jon W. Dudas

JON W. DUDAS
*Director of the United States Patent and Trademark Office*